(No Model.)

M. WOOD.
COMBINED BORING TOOL.

No. 421,218. Patented Feb. 11, 1890.

Witnesses
Wm. F. Heming
Louis M. F. Whitehead

Inventor
Morris Wood
by Dayton, Poole & Brown
Attorneys.

UNITED STATES PATENT OFFICE.

MORRIS WOOD, OF CHICAGO, ILLINOIS.

COMBINED BORING-TOOL.

SPECIFICATION forming part of Letters Patent No. 421,218, dated February 11, 1890.

Application filed November 11, 1889. Serial No. 329,930. (No model.)

*To all whom it may concern:*

Be it known that I, MORRIS WOOD, of Chicago, in the county of Cook and State of Illinois, have invented certain new and useful Improvements in Combined Boring-Tools; and I do hereby declare that the following is a full, clear, and exact description thereof, reference being had to the accompanying drawings, and to the letters of reference marked thereon, which form a part of this specification.

This invention has for its object to provide a tool adapted to bore a hole of any desired depth and to make a counterbore, also of any needed depth, at the same operation.

Figure 1:
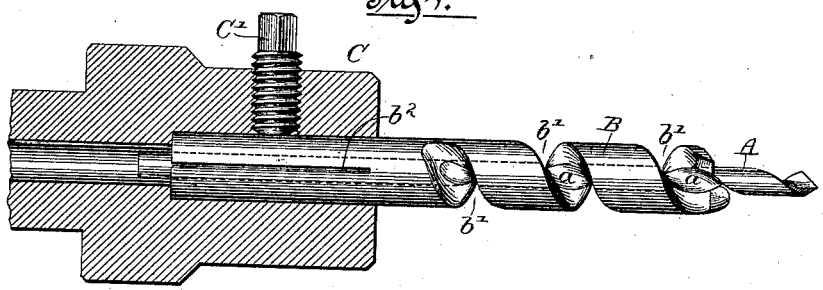
Figure 2:
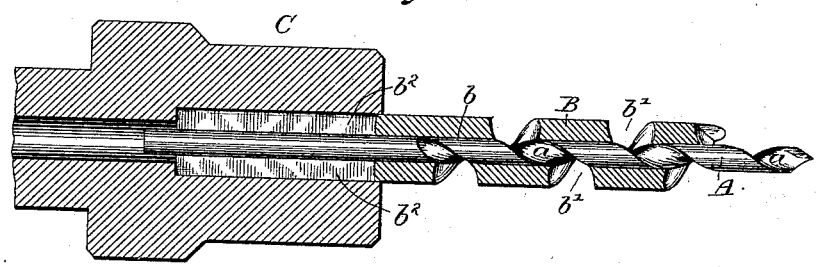
Figure 3:
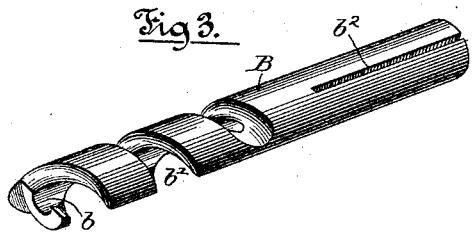
Figure 5:
Figure 4:

In the accompanying drawings, illustrating my invention, Figures 1, 2, and 3 show it in the form at present most approved, and Figs. 4 and 5 show it in certain less desirable, but still practicable forms. Fig. 1 is a side view of the combined tool, shown in connection with a chuck illustrated in central section. Fig. 2 is a longitudinal axial section of the hollow counterboring part of the tool with the bit therein. Fig. 3 is a perspective view of the hollow counterboring part of the tool detached. Fig. 4 illustrates the bit as being held in the counterboring member by means independent of the chuck, and Fig. 5 shows the bit as being shorter and screwed into the counterboring member.

A represents a bit of any desired size, having the twist or spiral groove $a$, by which it is adapted to discharge its chips as it enters the material being penetrated thereby.

B is the counterboring member of the tool, also of the twist form, that it, too, may discharge its chips and those made by the bit. The member B has a longitudinal axial hole $b$ therein, of proper size to accommodate the bit A, and its groove $a$ has the same pitch as the groove $b'$ of the counterboring member B, in order that the grooves in both may register or form in the combined tool a single groove extending to its axis, and thereby, when so set, to give free egress to the chips cut by both members A and B. Both said members may be of any desired length, and in the best form of the tool the bit may be set to project any desired distance beyond the counterboring member, so that both the hole bored by the bit A and the counterbore produced by the counterboring member B may be severally made of any desired depth.

As one means of holding the members A and B fixedly in any relation given them, the member B is shown in Figs. 1, 2, and 3 as having its shank end slit lengthwise at $b^2$, whereby when said shank is secured in its chuck or holder C by lateral compression of its shank, as by a set-screw C', it clamps the shank of the bit tightly in place within it. Other means for securing the members to each other may, however, be employed without departure from my principal invention— as shown, for example, in Fig. 4, in which a set-screw D, threaded through the side of an unslotted member B, bears upon the bit; or in Fig. 5, in which the bit is directly screw-threaded into the end of the member B.

The combined tool may manifestly be constructed either for boring in wood or for drilling in metal, the form of tool shown being that which is adapted for wood-working.

I am aware that a bit has been heretofore provided with an adjustable enlargement adapted to produce a mere countersink for a screw-head; but such enlargement is not adapted for boring a hole, for the reason that it has no spiral groove by which to discharge its own cuttings or those of the bit. Such enlargement of the former construction, therefore, formed, in fact, a stop limiting the penetration of the bit as well as its own. By the construction herein described there is no limit to the penetration of the counterboring member or of the combined tool, except its length. Of course it is practicable to give the cutting end of the counterboring member a suitable shape to form the seat for a wood-screw, if desired, so that it will give a countersink as well as or in addition to a counterbore.

I am also aware that a counterboring-tool has been constructed with a bit projecting from its cutting end, but integral therewith.

The present invention in either of the forms shown has the manifest advantage of permitting the bit to be replaced when broken instead of discarding the entire tool, and in all the forms illustrated, except that shown in Fig. 5, the bit may at any time be adjusted as to the distance of its protrusion, and when broken it may be resharpened and again set at the proper projection.

The old countersink-stop, above referred to as being adjustably secured to a bit or drill, if provided with a spiral groove, will constitute a counterboring member and will fall within my invention.

I claim as my invention—

1. The combined tool described, comprising a spirally-grooved bit or drill and a spirally-grooved counterboring member, the latter having a central lengthwise hole occupied by the bit or drill, and the spiral groove thereof corresponding in pitch with that of the bit, whereby the groove of one may coincide with that of the other.

2. The combination of a spirally-grooved bit or drill, a counterboring member having a central longitudinal hole occupied by the bit, and also having a spiral groove adapted to coincide with that of the bit, and means for securing the bit adjustably as to its protrusion within the counterboring member.

3. The spirally-grooved counterboring member B, having a through axial opening $b$, and a slit or slits $b^2$ in its shank, in combination with the bit or drill A, having a spiral groove which has the same pitch, and is thereby adapted to coincide with that of the member B, substantially as described.

In testimony that I claim the foregoing as my invention I affix my signature in presence of two witnesses.

MORRIS WOOD.

Witnesses:
M. E. DAYTON,
TAYLOR E. BROWN.